United States Patent [19]

Ninomiya et al.

[11] Patent Number: 4,637,959

[45] Date of Patent: Jan. 20, 1987

[54] MAGNETIC RECORDING MEDIUM

[75] Inventors: Yoshinobu Ninomiya; Masashi Somezawa; Kiyokazu Oiyama, all of Miyagi, Japan

[73] Assignee: Sony Corporation, Tokyo, Japan

[21] Appl. No.: 663,377

[22] Filed: Oct. 22, 1984

[30] Foreign Application Priority Data

Oct. 28, 1983 [JP] Japan .................................. 58-202345

[51] Int. Cl.⁴ ............................................... G11B 5/72
[52] U.S. Cl. .................................... 428/425.9; 360/134; 360/135; 360/136; 427/128; 427/131; 428/694; 428/900
[58] Field of Search ...................... 428/425.9, 694, 900, 428/695; 427/131, 44, 128; 252/62.54; 360/134–136

[56] References Cited

U.S. PATENT DOCUMENTS

| | | | |
|---|---|---|---|
| 3,650,828 | 3/1972 | Higashi | 428/425.9 |
| 4,152,485 | 5/1979 | Mizomura | 428/64 |
| 4,328,282 | 5/1982 | Lehner | 428/425.9 |
| 4,328,935 | 5/1982 | Steel | 428/329 |
| 4,404,253 | 9/1983 | Kohler | 428/900 |
| 4,419,406 | 12/1983 | Isobe | 427/131 |
| 4,529,661 | 7/1985 | Ninomiya | 428/329 |
| 4,567,108 | 1/1986 | Lehner | 428/900 |
| 4,567,109 | 1/1986 | Lehner | 428/900 |
| 4,568,610 | 2/1986 | Lehner | 428/900 |
| 4,568,612 | 2/1986 | Lehner | 428/900 |

Primary Examiner—Ellis P. Robinson
Attorney, Agent, or Firm—Hill, Van Santen, Steadman & Simpson

[57] ABSTRACT

A magnetic recording medium comprised of a non-magnetic substrate and a magnetic layer formed on one surface of the substrate and consisting essentially of a binder and magnetic powders. As the binder, a thermoplastic polyurethane-urea resin is employed, in which hydrophilic polar groups are introduced. The thermoplastic polyurethane-urea resin contains urethane and urea bonds in the molecule thereof and may be synthesized from a long-chain diol with a molecular weight of about 500 to 5000, a short-chain diol with a molecular weight of about 50 to 500, an organic diisocyanate and an organic diamine. Examples of the thus introduced hydrophilic polar groups are:

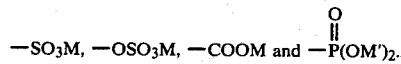

52 Claims, No Drawings

MAGNETIC RECORDING MEDIUM

BACKGROUND OF THE INVENTION

1. Field of the Invention

The present invention relates to a magnetic recording medium and, more particularly, to a magnetic recording medium having a coating layer in which a binder having improved properties is used.

2. Brief Description of the Prior Art

So far, the vinyl chloride-vinyl acetate copolymers, cellulose derivatives or polyester resins have been used extensively as the binder for the magnetic recording medium. The thermoplastic polyurethane resin has also been used for improving wear resistance or controlling coating properties of the magnetic layer of the recording medium.

On the other hand, the magnetic recording medium is required to satisfy the demand for high density recording. As a result thereof, attempts have been made towards reducing the size of the ferromagnetic powders to be filled in the magnetic layer and towards improved smoothness of the surface of the magnetic layer.

However, with improved surface smoothness of the magnetic layer, its contact area is increased, so that its running performance and durability are affected, while its anti-blocking performance is also drastically lowered. Above all, since the conventional binder has a low softening point and inferior heat resistance, when the magnetic recording medium in the tape form is taken up and stored on a reel under elevated temperatures or for a prolonged time, it is liable to become tightly affixed to the non-magnetic substrate neighboring to the magnetic layer. Thus, due to the resulting exfoliation of the magnetic layer, the properties of the magnetic recording medium are not exhibited satisfactorily. In addition, an increase in the specific surface resulting from comminution of ferromagnetic powders not only results in the drastically lowered dispersibility of the powders in the binder and deteriorates surface gloss and filling properties, but also renders it difficult to prevent powder debris or tape injury or to provide sufficient running durability or electromagnetic properties or characteristics that are critical to the magnetic recording medium.

Hence, in order to elevate heat resistance of the thermoplastic polyurethane resin and thereby improve anti-blocking of the magnetic recording medium, it has been proposed to use the thermoplastic polyurethane resin as the binder for the magnetic layer of the recording medium, wherein the ratio of the low molecular weight diol in the thermoplastic polyurethane resin is increased for elevating the concentration of the urethane groups in the molecule.

The thermal properties of thermoplastic polyurethane resins may be improved in general by increasing the concentration of the urethane groups. That is, the higher the concentration of the urethane groups in the molecule, the higher the softening point of the thermoplastic polyurethane resin and the lower its glass transition temperature. However, with increase in urethane group concentration in the thermoplastic polyurethane resin, it becomes undesirably insoluble in general-purpose solvents such as ketones, alcohols, esters, aromatic hydrocarbons or aliphatic hydrocarbons, it being only soluble in solvents of higher toxicity such as dimethylformamide or tetrahydrofuran. Moreover, dimethylformamide or tetrahydrofuran used as solvent for a magnetic paint for formation of the magnetic layer may corrode surface portions of the substrate on which the paint is applied, or any surface portions or materials with which it may be brought into contact, so that creases or wrinkles are partially caused or, in some cases, these portions may become dissolved. Therefore, there is a limitation on improvement by elevating the concentration of urethane groups in the thermoplastic polyurethane resin.

Furthermore, even when the thermoplastic polyurethane resin with elevated concentration in the urethane groups is used as the binder for the magnetic layer, it has only negligible effects in improving the dispersibility of the comminuted ferromagnetic powders in the binder.

OBJECTS AND SUMMARY OF THE INVENTION

It is an object of the present invention to provide a magnetic recording medium with a layer containing a thermoplastic polyurethane-urea resin having improved heat resistance, anti-blocking and durability as a binder.

It is another object of the present invention to provide a magnetic recording medium with a layer containing a binder further having improved compatibility with other resin and a solvent.

It is a further object of the present invention to provide a magnetic recording medium with a layer containing a binder further having improved dispersibility of a pigment, an inorganic filler or the like.

According to an aspect of the present invention, there is provided a magnetic recording medium comprising a non-magnetic substrate and a magnetic layer formed thereon composed mainly of magnetic powder and a binder, said binder containing a thermoplastic polyurethane-urea resin having at least one hydrophilic polar group selected from the groups represented by general formulas:

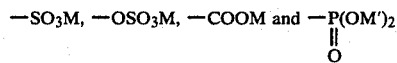

wherein M is hydrogen or alkali metal and M' is hydrogen, alkali metal or hydrocarbon group.

DESCRIPTION OF THE PREFERRED EMBODIMENTS

The present inventors conducted many researches with a view to overcoming these deficiencies and found that the thermoplastic polyurethane-urea resin in which hydrophilic polar group or groups are introduced as side chain or side chains thereof, or a cured product of the resin obtained upon reaction between the polyisocyanate curing agent and the resin, has such an advantage that the magnetic layer of the magnetic recording medium prepared thereby has improved anti-blocking and improved dispersibility of the ferromagnetic powders, and that, in addition, the resin is readily soluble in general-purpose solvents. Such finding has led to completion of the present invention, which resides in a magnetic recording medium having a non-magnetic substrate and a magnetic layer formed thereon and consisting essentially of ferromagnetic powders and a binder. It is characterized in that a thermoplastic polyurethane-urea resin obtained by reacting long-chain diols with the molecular weight ranging between about 500 and about 5000, short-chain diols with the molecular weight ranging between about 50 to about 500, organic diamines, organic diisocyanates and compounds containing hydrophilic polar groups, is contained as a binder in the magnetic layer, and in that a cured product obtained by reacting the aforementioned thermoplastic polyurethane-urea resin and a polyisocyanate curing agent is contained as the binder in the magnetic layer.

The thermoplastic polyurethane-urea resin has a characteristic that both urethane bonds and urea bonds are contained in the molecule of the resin, and in that hydrophilic polar group or groups are introduced to a side chain or side chains of the molecule.

The aforementioned urethane and urea bonds play an important role in improving thermal properties of the binder and provide for lowering the glass transition temperature of the resin and elevating its softening point which is a measure of the heat resistancy of the resin. In addition, these bonds are effective in improving anti-blocking and maintaining stable physical properties of the magnetic layer over a wide range of temperature. Thus the introduction of the urea groups as well as that of urethane groups is effective in markedly elevating the thermal properties of the resin. More importantly, the introduction of urea groups gives a resin which is readily soluble in a solvent system consisting essentially of a combination of the aforementioned solvents, that is, ketones, alcohols, esters, aromatic hydrocarbons and aliphatic hydrocarbons. Moreover, the concentration of the polar groups (urethane and urea groups) in the thermoplastic polyurethane-urea resin molecules can be rendered higher than that in the ordinary thermoplastic polyurethane resin, thus resulting in the improved interaction among the neighboring molecules and improved durability and coating properties of the resulting magnetic layer. Thus, by using the thermoplastic polyurethane-urea resin as the binder for the magnetic recording medium, there may be provided a magnetic recording medium which is superior in anti-blocking and durability.

The combined concentration of the aforementioned thermoplastic polyurethane-urea resin is preferably 1.8 to 3.0 m mol/g. With the concentration less than 1.8 m mol/g, the softening point of the resin is lowered and anti-blocking is not improved. With the concentration exceeding 3.0 m mol/g, the resin becomes insoluble in general-purpose solvents, it being soluble only in dimethylformamid or the like toxic solvents. On the other hand, the ratio of urea group concentration to urethane group concentration is preferably in the range of 0.3 to 1.6. With the ratio less than 0.3, the resin is insoluble in general-purpose solvents and, with the ratio in excess of 1.6, the glass transition temperature of the resin becomes higher.

Since the hydrophilic polar groups introduced as side chain into a thermoplastic polyurethane-urea resin exhibit superior affinity with the ferromagnetic particles mixed into the magnetic layer, it is highly effective in dispersing these ferromagnetic powders into the binder so as to deal successfully with the increased specific surface of the ferromagnetic powders. In addition, the introduction of the hydrophilic polar groups into the thermoplastic polyurethane-urea resin contributes markedly to improved dispersibility of the ferromagnetic powders and to improved physical properties of the magnetic layer. Thus the introduction of the hydrophilic polar groups renders it possible that the ferromagnetic powders and the binder interact directly with one another so that the magnetic layer exhibits superior strength and durability.

The amount of the hydrophilic polar groups introduced into the thermoplastic polyurethane-urea resin is preferably in the range of 0.01 to 1.0 m mol/g and more preferably in the range of 0.1 to 0.5 m mol/g. With the amount of the hydrophilic polar groups less than 0.1 m mol/g, the groups are not sufficiently effective in improving dispersibility of the ferromagnetic powders. With the amount in excess of 1.0 m mol/g, intermolecular or intramolecular aggregation may take place so that the dispersibility of the ferromagnetic powders is lowered and/or the ordinary or general-purpose solvents are unable to be used with the resin.

It should be noted that the number-average molecular weight of the thermoplastic polyurethane-urea resin is preferably 10000 to 100000 and more preferably 10000 to 60000. With the number-average molecular less than 10000, the film forming capacity of the resin becomes insufficient. With the number-average molecular weight higher than 60000, the mixing, transport and coating steps during the preparation of the magnetic paint may be affected adversely.

The softening temperature of the thermoplastic polyurethane-urea resin is preferably higher than 80° C. and more preferably higher than 100° C. With the softening temperature lower than 80° C., the properties of the resin are closer to those of the conventional thermoplastic polyurethane resin so that it becomes impossible to improve physical properties and anti-blocking of the thermoplastic polyurethane-urea resin.

It should also be noted that the glass transition temperature of the polyurethane-urea resin is preferably lower than 0° C. and more preferably lower than $-10°$ C. With the glass transition temperature higher than $-10°$ C., the transition temperature of the physical properties approaches undesirably to ambient temperature.

The method of preparing a thermoplastic-urea resin employed in the magnetic recording medium of the present invention is now explained.

The thermoplastic polyurethane-urea resin is obtained by a polyaddition reaction of long-chain diols, short-chain diols, organic diamines and organic diisocyanates. The polyaddition reaction is carried out by a prepolymer method in which a mixture of long-chain diols and short-chain diols is previously reacted with organic diisocyanates to give a prepolymer having an isocyanate group or isocyanate groups at the terminal or terminals thereof and the organic diamine is added to the resulting prepolymer to permit chain prolongation and introduction of an urea group or urea groups.

The long-chain diol used for preparation of the thermoplastic polyurethane-urea has a molecular weight of approximately 500 to 5000 and is classified for example into polyester diols, polyether diols and polyetheresterglycols. The polyester diols may include lactonic polyester diols obtained by ring opening polymerization of lactones such as e-caprolactone, or polyester diols obtained by reacting aliphatic dicarboxylic acids such as succinic acid, sebacic acid or azelaic acid, aromatic dicarboxylic acids such as terephthalic acid or isophthalic acid or esters thereof with lower alcohols with ethylene glycol, 1,3-propyrene glycol, 1,4-butylene glycol, 1,6-hexane glycol, diethylene glycol, 1,6-hexane glycol, diethylene glycol, neopentyl glycol, an ethylene oxide adduct of bisphenol A or a mixture thereof. The polyether diols may for example include polyalkylene ether glycols such as polyethylene glycol, polypropyrene ether glycol, polytetramethylene ether glycol, or a polyether glycol, which is a copolymer thereof. The polyether ester glycols may for example be obtained by reacting aliphatic or aromatic dicarboxylic acid with the aforementioned polyalkylene ether glycol as polyol component. If the molecular weight of the long-chain diol is too small, the concentration of urethane groups of the resulting thermoplastic polyurethane-urea resin becomes too high so that the resin becomes less pliable and less soluble in solvents. This is not desirable when the resin is to be used as the binder for the magnetic recording medium. On the other hand, when the molecular weight of the long-chain diol is too large, the contents of long-chain diols in the resin become too high so that the concentration of the urethane groups is too low, resulting in the lower wear and heat resistancy of the resin.

The short-chain diols employed for preparation of the thermoplastic polyurethane-urea resin has a molecular weight approximately equal to 50 to 500, and may for example include aliphatic glycols such as ethylene glycol, propyrene glycol, 1,4-butylene glycol, 1,6-hexane glycol or neopentyl glycol, or aromatic diols such as ethylene or propyrene adduct of bisphenol A or ethylene oxide adduct of hydroquinone, these being used either singly or in combination at any desired mixture ratio depending on the desired properties of the polyurethane-urea resin.

The aforementioned organic diamines may include aliphatic diamines such as tetramethylene diamine or hexamethylene diamine, aromatic diamines such as m-phenylene diamine, p-phenylene diamine, 2,4-tolylenediamine, 2,6-tolylenediamine, m-xylylenediamine, p-xylylenediamine, diphenylmethanediamine, 3,3'-dimethoxy-4,4'-biphenylenediamine, 3,3'-dimethoxy-4,4'-biphenylenediamine, 3,3'-dimethyl-4,4'-biphenylenediamine, 4,4'-diaminodiphenylether, 1,5-naphthalenediamine or 2,4-naphthalenediamine, or cycloaliphatic diamines such as 1,3-diaminomethylcyclohexane, 1,4-diaminomethylcyclohexane, 4,4'-diaminodicyclohexylmethane or isophoronediamine.

The organic diisocyanates may include aliphatic diisocyanates such as tetramethylene diisocyanate or hexamethylene diisocyanate, aromatic diisocyanates such as m-phenylene diisocyanate, p-phenylene diisocyanate, 2,4-tolylene diisocyanate, 2,6-tolylene diisocyanate, diphenylmethane diisocyanate, 3,3'-dimethoxy-4,4'-biphenylene diisocyanate, 3,3'-dimethyl-4,4'-biphenylene diisocyanate, 4,4'-diisocyanate diphenyl ether, 1,5-naphthalene diisocyanate or 2,4-naphthalene diisocyanate or cycloaliphatic diisocyanates such as 1,3-diisocyanate methyl cyclohexane, 1,4-diisocyanate methyl cyclohexane, 4,4'-diisocyanate dicyclo hexylmethane or isophorone diisocyanate.

When the polyisocyanate curing agent is used in combination with the aforementioned thermoplastic polyurethane-urea resin, there can be obtained a magnetic recording medium with excellent wear-resistance. Any polyisocyanate curing agents so far known and used in the art, such as "Coronate L" (manufactured by Nippon Polyurethane Kogyo KK) or "Desmodule L" (manufactured by Bayer AG), may be used as aforementioned polyisocyanate curing agents. These polyisocyanate curing agents can be used in accepted amounts.

In the above described reaction, the molar ratio of the short-chain diols to the long-chain diols is preferably less than 3. If the molar ratio is too large, the concentration of the urethane groups becomes too high so that the resulting polyurethane-urea resin is undesirably not soluble in the aforementioned general-purpose solvents used for the preparation of the magnetic paint. When the straight chain diols such as ethylene glycol, 1,4-butylene glycol or 1,6-hexane glycol are employed as short-chain diols, the aforementioned molar ratio is preferably less than 1 and more preferably less than 0.5. When ethylene or propyrene oxide adducts of bisphenol A or branched short-chain diols such as neopentylglycol are used as short-chain diols, the aforesaid molar ratio may be increased as compared to the case of using the straight chain diols because the resin exhibits an improved solubility. However, the aforementioned molar ratio higher than 3 is not desirable because the solubility of the resin is correspondingly lowered.

In the preparation of the thermoplastic polyurethane-urea resin employed in the present invention, polyester diols, and above all polybutylene adipate, polyhexamethylene adipate or polycaprolactonediol among the aforementioned compounds are most preferred as long-chain diols having the molecular weight of approximately 500 to 5000. Likewise, branched short-chain diols and above all neopentyl glycol among the aforementioned compounds are most preferred as short-chain diols having the molecular weight of approximately 50 to 500. On the other hand, isophorone diamine is most preferred among the aforementioned compounds as the organic diamines, while 4,4-diphenylmethane diisocyanate and isophorone diisocyanate are most preferred among the aforementioned compounds as the organic diisocyanates.

The methods of polyaddition reaction adopted in the preparation of the thermoplastic polyurethane-urea resin employed in the present invention may include a melt polymerization according to which the reaction is carried out in the molten state, and solution polymerization according to which the reaction is carried out in a solution of the raw materials as referred to hereinabove in an inert solvent such as ethyl acetate, methylethylketone, acetone or toluene or a mixture thereof. For the manufacture of the thermoplastic polyurethane resins which are employed in a solution in a solvent in many cases, such as the binder for the magnetic recording medium, the solution polymerization is preferred. It is particularly preferred that the melt polymerization is carried out during the preparation of the prepolymer and, prior to the chain prolongation reaction, the solution polymerization of the prepolymers is carried out in a solution thereof in the inert solvent.

In carrying out the reaction, organometallic compounds such as organotin compounds, e.g. stannous octylate, dibutyltin dilaurate, or tertiary amines such as N-methyl morpholine or triethylamine may be added as catalyst. In order to increase the stability of a product, an antioxidant, an ultraviolet ray absorbing agent, a hydrolysis preventive agent or the like may be added in necessary amounts.

The hydrophilic polar groups are introduced into the thermoplastic polyurethane-urea resin. The hydrophilic polar groups may include

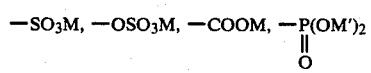

wherein M represents a hydrogen atom or an alkali metal and M' a hydrogen atom, an alkali metal or a hydrocarbon residue.

The methods of introducing these hydrophilic polar groups into the thermoplastic polyurethane-urea resin may include (i) employing a compound containing hydrophilic polar groups as one of the raw materials for the preparation of the thermoplastic polyurethane-urea resin; and (ii) denaturing thermoplastic polyurethane-urea resin containing two or more -OH groups with a compound or compounds containing hydrophilic polar groups.

The compounds containing hydrophilic polar groups employed in the method (i) may include diols containing hydrophilic polar groups, diisocyanates containing hydrophilic polar groups, and diamines containing hydrophilic polar groups. These compounds are polymerized with other raw materials to form a part of the high polymeric chain of the thermoplastic polyurethane-urea resin, as a result of which the hydrophilic polar groups are introduced into the thermoplastic polyurethane-urea resin.

The aforementioned diols containing hydrophilic polar groups may include diols containing phosphoric acid ester groups represented by the general formula

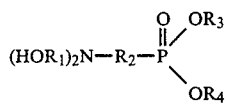

wherein $R_1$ represents alkylene groups with 2 to 6 carbon atoms with or without substituents, $R_2$ represents alkylene groups with 1 to 6 carbon atoms, with or without substituents, and $R_3$, $R_4$ represent alkyl groups with 1 to 6 carbon atoms.

The diols containing the hydrophilic polar groups may also be diols containing —$SO_3M$ groups, where M represents a hydrogen atom or an alkali metal. The diols containing —$SO_3M$ groups may be obtained by reacting a carboxylic acid component not containing —$SO_3M$ groups, a glycol component and a dicarboxylic acid component containing —$SO_3M$ groups.

The carboxylic acid component not containing the —$SO_3M$ groups may be enumerated by aromatic dicarboxylic acids such as terephthalic acid, isophthalic acid, orthophthalic acid or 1,5-naphthalic acid, aromatic oxycarboxylic acids such as p-oxybenzoic acid or p-(hydroxyethoxy) benzoic acid, aliphatic dicarboxylic acids such as succinic acid, adipic acid, sebacic acid or dodecanedicarboxylic acid, and tri- and tetracarboxylic acids such as trimellitic acid, trimesic acid and pyromellitic acid.

The aforementioned glycol component may be enumerated by ethylene glycol, propyrene glycol, 1,3-propanediol, 1,4-butanediol, 1,5-pentanediol, 1,6-hexanediol, neopentylglycol, diethylene glycol, dipropyrene glycol, 2,2,4-trimethyl-1,3-pentanediol, 1,4-cyclohexanedimethanol, ethylene oxide adduct and propyrene oxide adduct of bisphenol A, ethylene oxide adduct and propyrene oxide adduct of hydrogenated bisphenol A, polyethyleneglycol, polypropyrene glycol and polytetramethylene glycol. Tri- and tetraols such as trimethylolethane, trimethylolpropane, glycerin and pentaerythritol may also be used in conjunction with the aforementioned glycol component.

The dicarboxylic acid component not containing the —$SO_3M$ groups may be enumerated by 5-sodium sulfo-isophthalic acid, 5-potassium-sulfo-isophthalic acid, 2-sodium-sulfo-terephthalic acid and 2-potassium-solfo-terephthalic acid.

The aforementioned organic diisocyanates containing the hydrophilic polar groups can be obtained by reacting polyisocyanate compounds having three or more functional groups with a compound or compounds containing the hydrophilic polar groups.

Among these polyisocyanate compounds, there are known trifunctional compounds known under the trade names of "Desmodule L" (manufactured by Bayer AG) and "Coronate L" (manufactured by Nippon Polyurethane Co. Ltd.). In general, the polyfunctional polyisocyanate compounds may be obtained by addition reaction of polyols and polyisocyanates.

The polyols may include propyrene glycol, glycerol, trimethylolpropane, pentaerithritol and sorbitol. The polyisocyanates may include tolylene diisocyanate, 4,4-diphenylmethane diisocyanate, naphthylene diisocyanate, hexamethylene diisocyanate, isophorone diisocyanate, xylene diisocyanate and lysine diisocyanate.

Several methods of introducing the hydrophilic polar groups into the polyisocyanate compounds having three or more functional groups are briefly explained below.

(i) The method of the introduction of the —$SO_3M$ groups

A compound having a —$SO_3M$ group and more than two —NCO groups in one molecule may be obtained by reacting a compound having a —$SO_3M$ group in one molecule and one or more active hydrogen capable of reacting with —NCO groups with a polyisocyanate compound having more than three functional groups.

The compound having a —$SO_3M$ group and one or more active hydrogen capable of reacting with —NCO groups in one molecule may be enumerated by:

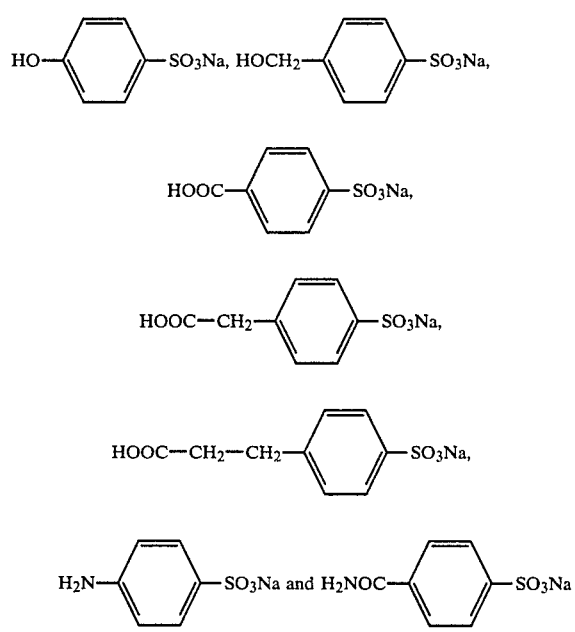

These compounds undergo an addition reaction with polyisocyanate compounds having more than three functional groups as shown by the following formula:

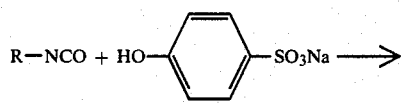

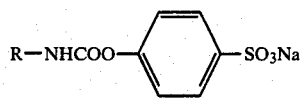

wherein R—NCO represents a polyisocyanate compound having three or more functional groups.

(ii) The method of the introduction of the —COOM group

The compound having a —COOM group and two or more —NCO groups in the molecule may be obtained by reacting a compound having a —COOM group in one molecule and one or more active hydrogen capable of reacting with the —NCO groups with a polyisocyanate compound having three or more functional groups.

The compound having a —COOM group in one molecule and an active hydrogen capable of reacting with the —NCO group may be enumerated, for example, by

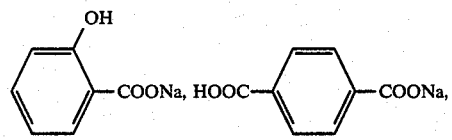

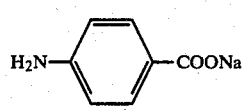

These compounds undergo an addition reaction with a polyisocyanate compound having three or more functional groups as shown for example by the following formula

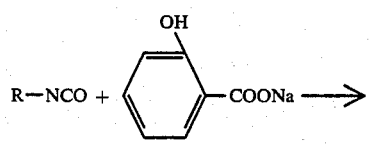

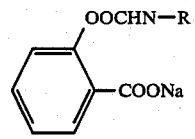

where R—NCO represents a polyisocyanate compound with three or more functional groups.

(iii) The method of the introduction of the —SO$_3$M group

The compound having a —OSO$_3$M group and two or more —NCO groups in one molecule may be obtained by neutralizing a polyisocyanate compound having three or more functional groups and H$_2$SO$_4$ with NaOH or KOH as shown for example by the following formula

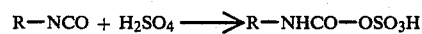

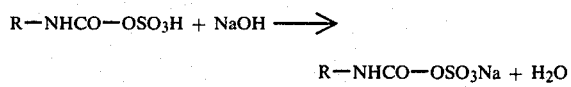

wherein R—NCO represents a polyisocyanate compound having three or more functional groups.

(iv) The method of the introduction of the

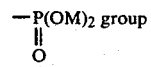

The introduction may be effected by neutralizing a reaction product of the polyisocyanate compound with three or more functional groups and H$_3$PO$_3$ with NaOH or KOH as shown for example by the formula

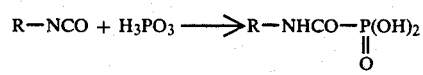

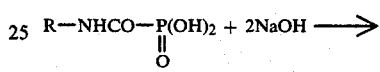

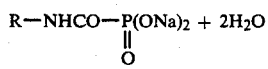

where R—NCO represents a polyisocyanate compound having three or more functional groups.

The aforementioned organic diamines containing the hydrophilic polar groups may include an equimolar reaction product of an aliphatic or cycloaliphatic amine and an acid anhydride as shown by a general formula

wherein R$_5$, R$_6$ denote hydrocarbon residues with 2 to 12 carbon atoms, or alkali metal salts thereof. Among these aliphatic or cycloaliphatic diamines, tetramethylenediamine, hexamethylenediamine, 1,3-diaminomethylcyclohexane, 1,4-diaminomethylcyclohexane, 1,4-diaminomethylcyclohexane, 4,4-diaminodicyclohexane and isophoronediamine and, above all, isophoronediamine, are preferred. The acid anhydrides may include succinic acid anhydride, maleic acid anhydride, phthalic acid anhydride, hexahydrophthalic acid anhydride

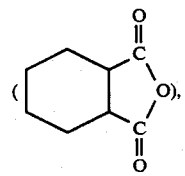

3-methyl-1,2,3,6-tetrahydrophthalic acid anhydride and 4-methyl-1,2,3,6-tetrahydrophthalic acid anhydride.

(A) As a practical example of the method (2) above, a compound having the chlorine and the hydrophilic polar group in the molecule and a thermoplastic polyurethane-urea resin having plural OH groups are dissolved in a solvent in which the both components are soluble, such as dimethylamide or dimethylsulfoxide, and the resulting solution is subjected to a reaction in the presence of amines such as amines, e.g. pyridine, picoline or triethylamine or epoxy compounds such as ethylene oxide or propyrene oxide for elimination of hydrochloric acid and introduction of the hydrophilic polar groups. The reaction proceeds as shown by the following chemical formulas $$R'-OH + ClCH_2CH_2SO_3M \longrightarrow R'-OCH_2CH_2SO_3M + HCl \quad (A-1)$$

$$R'-OH + ClCH_2CH_2OSO_3M \longrightarrow R'-OCH_2CH_2OSO_3M + HCl \quad (A-2)$$

$$R'-OH + ClCH_2COOM \longrightarrow R'-OCH_2COOM + HCl \quad (A-3)$$

$$R'-OH + ClCH_2\underset{\underset{O}{\parallel}}{P}(OM')_2 \longrightarrow R'-OCH_2\underset{\underset{O}{\parallel}}{P}(OM')_2 + HCl \quad (A-4)$$

Where R represents a thermoplastic polyurethane-urea resin.

(B) Although small amounts of secondary products are yielded, the following methods may be used for introducing the polar group. Thus, $HOCH_2CH_2SO_3M$, $HOCH_2CH_2OSO_3M$ $HOCH_2COOM$ or $$HOCH_2\underset{\underset{O}{\parallel}}{P}(OM)_2$$

is reacted with an equimolar amount of a diisocyanate compound, such as 4,4'-diphenylmethane diisocyanate, tolylene diisocyanate or hexamethylene diisocyanate, and a reaction product between one of the —NCO groups of the diisocyanate and the OH group in the aforementioned molecule is yielded. The thermoplastic polyurethane-urea resin with the hydrophilic polar groups introduced therein may then be obtained by the reaction of the —OH group in the thermoplastic polyurethane-urea resin and the remaining —NCO group.

$$OCN-R''-NCO + HOCH_2CH_2SO_3M \longrightarrow \quad (B-1)$$
$$OCN-R''-NHCOOCH_2CH_2SO_3M$$

$$R'-OH + OCN-R''-NHCOOCH_2CH_2SO_3M \longrightarrow$$
$$R'-OCONH-R''-NHCOOCH_2CH_2SO_3M$$

$$OCN-R''-NCO + HOCH_2CH_2OSO_3M \longrightarrow \quad (B-2)$$
$$OCN-R''-NHCOOCH_2CH_2OSO_3M$$

$$R'-OH + OCN-R''-NHCOOCH_2CH_2OSO_3M \longrightarrow$$
$$R'-OCONH-R''-NHCOOCH_2CH_2OSO_3M$$

$$OCN-R''-NCO + HOCH_2COOM \longrightarrow \quad (B-3)$$
$$OCN-R''-NHCOOCH_2COOM$$

$$R'-OH + OCN-R''-NHCOOCH_2COOM \longrightarrow$$
$$R'-OCONH-R''-NHCOOCH_2COOM$$

$$OCN-R''-NCO + HOCH_2\underset{\underset{O}{\parallel}}{P}(OM')_2 \longrightarrow \quad (B-4)$$
$$OCN-R''-NHCOOCH_2\underset{\underset{O}{\parallel}}{P}(OM')_2$$

$$R'-OH + OCN-R''-NHCOOCH_2\underset{\underset{O}{\parallel}}{P}(OM')_2 \longrightarrow$$
$$R'-OCONH-R''-NHCOOCH_2\underset{\underset{O}{\parallel}}{P}(OM')_2$$

where R' represents a thermoplastic polyurethane-urea resin and R'' a bivalent hydrocarbon residue.

The thermoplastic polyurethane-urea resin with the hydrophilic polar groups introduced into the side chain may be used in combination with other thermoplastic resin, thermosetting resin or other reactive resin. In this case, the weight ratio of the thermoplastic polyurethane-urea resin to the total weight of the binder of the magnetic layer is preferably more than 5 wt. %. When the weight ratio of the thermoplastic polyurethane-urea resin to the total binder is less than 5 wt. %, an improvement in anti-blocking of the magnetic recording medium is not to be expected. The aforementioned thermoplastic resin should have a softening temperature less than 150° C., an average molecular weight ranging between 10000 and 200000 and a polymerization degree of approximately 200 to 2000, and may be enumerated by vinyl chloride-vinyl acetate copolymers, vinyl chloride-vinylidene chloride copolymers, vinyl chloride-acrylonitrile copolymers, acrylic acid ester-acrylonitrile copolymers, thermoplastic polyurethane elastomers, polyvinyl fluoride, vinylidene chloride-acrylonitrile copolymers, polyamide resins, polyvinylbutyrale, cellulose derivatives, polyester resins, and thermoplastic resins of the synthetic rubber system such as polybutadiene. The thermosetting or reactive resin may be enumerated for example by phenolic resin, epoxy resin, polyurethane cured type resin, melamine resin, alkyd resin, silicon resin, acrylic reactive resin, epoxy-polyamide resin, nitrocellulose-melamine resin, a mixture of high polymeric polyester resin and isocyanate prepolymer, a mixture of a polyester polyol and a polyisocyanate urea-formaldehyde resin, a low polymeric glycol-high polymeric dioltriphenylmethane triisocyanate mixture, polyamine resin or mixtures thereof.

The magnetic layer can be formed by dispersing the ferromagnetic powders into the binder, dissolving the dispersion in an organic solvent and coating the resulting magnetic point on a ferromagnetic substrate.

The ferromagnetic powders employed in accordance with the present invention may include ferromagnetic iron oxide particles, ferromagnetic chromium dioxide or ferromagnetic alloy powders.

The aforementioned ferromagnetic iron oxide particles may include those represented by the general formula $FeO_x$ wherein X is in the range of $1.33 \leq X \leq 1.50$, that is, maghemite (gamma - $Fe_2O_3$, X=1.50) and magnetite ($Fe_3O_4$, X=1.33) and solid solutions thereof (FeOx, 1.33<X<1.50). These iron oxides, such as gamma - Fe$_2$O$_3$ or Fe$_3$O$_4$, are usually obtained by the following process. An alkali is added to a solution of ferrous salts to give a ferrous hydroxide which is oxidized by air blown thereinto at a preset temperature. The resulting needle-like iron oxide hydrate is used as the starting material and heated at 250° to 400° C. in air for dehydration. The iron oxide is then reduced by heating at 300° to 450° C. in a reducing atmosphere to give needle-like magnetite particles, which may optionally be re-oxidized at 200° to 350° C. to give needle-like maghemite (gamma - Fe$_2$O$_3$). If desired, cobalt can be added to the ferromagnetic iron oxides for improving the coercive force. The cobalt-containing magnetic iron oxides may be classified into two types, namely, the dope type and coat type. The Co-doped iron oxide particles are produced by any of the following methods.

(i) Ferrous hydroxide which contains cobalt hydroxide is treated hydrothermally in an alkaline atmosphere and the resulting pulverulent material is subjected to reduction-oxidation.

(ii) In preparing the goethite, a cobalt salt solution is previously added and the cobalt-containing goethite is prepared and subjected to reduction-oxidation while the pH is adjusted to a suitable value.

(iii) The reaction similar to that in (ii) is carried out on the goethite nuclei free of Co for allowing the growth of the Co-containing goethite which is then subjected to reduction-oxidation.

(iv) The needle-like goethite or maghemite is superficially treated in a Co-containing alkaline aqueous solution for adsorption of the cobalt compound on the surface of the needle-like goethite or maghemite, which is then subjected to reduction-oxidation or heat treatment at a higher temperature. The Co-coated type iron oxide magnetic particles may be prepared by a process in which a cobalt salt and needle-like magnetic iron oxides are mixed in an alkaline aqueous solution under heating for adsorbing the cobalt compound, e.g. cobalt hydroxide, the resulting product is taken out after washing with water and drying, and the dried product is heat-treated under a non-reducing atmosphere such as air or a nitrogen gas. As compared to the Co-doped particles, the Co-coated particles have such a feature that it has superior transfer and demagnetizing properties when used in the preparation of the magnetic tape.

The aforementioned ferromagnetic chromium dioxide CrO$_2$ may be optionally mixed with at least one of the additives effective to improve the coercive force, such as Ru, Sn, Te, Sb, Fe, Ti, V or Mn. Basically, chromium dioxide may be obtained by thermally cracking chromium trioxide (CrO$_3$) in the presence of water at a pressure of at least 500 atm and a temperature of 400° to 525° C. It is also known to crack chromium trioxide (CrO$_3$) at a temperature of 250° to 375° C. in the presence not only of oxygen but also of nitrogen monoxide (NO). The ferromagnetic metal or alloy powders may include Fe, Co, Ni, Fe—Co, Fe—Ni or Fe—Co—Ni to which metal components such as Al, Si, Ti, Cr, Mn, Cu or Zn may be added for improving various physical properties. These ferromagnetic metal or alloy powders may be produced by any of the following methods.

(i) The organic acid salts (mainly oxalates) of ferromagnetic metals and alloys are thermally cracked and reduced by a reducing gas.

(ii) The needle-like iron oxyhydroxide with or without Co contents or the needle-like magnetic iron oxide is reduced in a reducing gas.

(iii) The ferromagnetic metals or alloys are vaporized in an inert gas atmosphere.

(iv) The metal carbonyl compounds are subjected to cracking.

(v) The powders of ferromagnetic metals are electrodeposited by mercury electrolysis, after which mercury is separated and removed.

(vi) The ferromagnetic metal salts are subjected in a solution to a wet reduction with sodium hydrophosphite or sodium boron hydride.

In addition to the aforementioned binder and the fine powders of the ferromagnetic materials, additives such as dispersants, lubricants, abrasives, antistatic agents or antiseptics may also be incorporated into the magnetic layer.

As the aforementioned dispersants (pigment wetting agents), fatty acids with 12 to 18 carbon atoms (R$_7$COOH, wherein R$_7$ represents alkyl or alkenyl groups having 11 to 17 carbon atoms), such as caprylic acid, capric acid, lauric acid, myristic acid, palmitinic acid, stearic acid, oleic acid, elaidic acid, linolic acid or stearolic acid; metal soaps consisting of alkali metal salts (such as Li, Na or K salts) or alkali earth metal salts (such as Mg, Ca or Ba salts) of the aforementioned fatty acids; fluorine compounds of the esters of the aforementioned fatty acids; amides of the aforementioned fatty acids; poly-alkylenoxide alkyl-phosphoric esters; or tri-alkyl-poly-olefin oxy-quaternary ammonium salt, where alkyl has 1 to 5 carbon atoms, and olefin may be ethylene or propyrene, may be used. Higher alcohols with more than 12 carbon atoms and sulfuric acid esters may also be employed. These dispersants may be used in an amount of 0.5 to 20 parts by weight to 100 parts by weight of the binder.

As the aforementioned lubricants, a silicon bil such as dialkylpolysiloxane (with 1 to 5 carbon atoms in the alkyl part), dialcoxypolysiloxane (with 1 to 4 carbon atoms in the alcoxy component), monoalkyl-monoalcoxypolysiloxane (with 1 to 5 carbon atoms in the alkyl part and 1 to 4 carbon atoms in the alcoxy part), phenylpolysiloxane or fluoroalkylpolysiloxane (with 1 to 5 carbon atoms in the alkyl part), fine powders of the electrically conductive material such as graphite, fine powders of the inorganic materials such as molybdenum disulfide wolfram disulfide, fine powders of plastics materials such as polyethylene, polypropyrene, polyethylene-vinyl chloride copolymer or polytetrafluoroethylene, alfa-olefin polymers, unsaturated aliphatic hydrocarbons that are liquid at ambient temperature (compounds having an alfa-olefin double bond attached to the terminal carbon, with about 20 carbon atoms), fatty acid esters formed by a monobasic fatty acid with 12 to 20 carbons and a monohydric alcohol with 3 to 12 carbons) and fluorocarbons, may be employed. These lubricants may be used in an amount of 0.2 to 20 parts by weight to 100 parts by weight of the binder.

As the aforementioned abrasives, those commonly used materials such as molten alumina, silicium carbide, chromium oxide (Cr$_2$O$_3$), corrundum, artificial corrundum, diamond, artificial diamond, garnet or emery (consisting essentially of corrundum and magnetite), may be employed. Preferably, these abrasives should have Mohs hardness higher than 5 and an average particle size in the range of 0.05 to 5 microns and especially in the range of 0.1 to 2 microns. These abrasives may be used in an amount of 0.5 to 20 parts by weight to 100 parts by weight of the binder.

As the aforementioned antistatic agents, fine powders of the electrically conductive materials, such as carbon black or carbon black graft polymer, natural surfactants such as saponin, nonionic surfactants derived from alkylene oxides, glycerin or glycidols, higher alkylamines, quaternary ammonium salts, heterocyclic compounds such as pyridine, cationic surfactants such as phosphonium, anionic surfactants containing carboxylic acid residues, sulfonic acid residues, phosphoric acid residues or acidic groups such as sulfuric acid ester or phosphoric acid ester residues, or amphoteric surfactants such as amino acids, aminosulfonic acids or surfuric acid or phosphoric acid esters of amino alcohols, may be employed. The aforementioned fine powders of the electrically conductive materials and surfactants may be used in amounts of 0.2 to 20 parts by weight and 0.1 to 10 parts by weight to 100 parts by weight of the binder, respectively. These surfactants may be used either singly or as a mixture. While these surfactants are used as antistatic agents, they may also be used for other purposes, as for example for improving dispersion or magnetic properties or lubricity or as coating assistive agents.

As the aforementioned anti-corrosive agents, phosphoric acid, sulfamide, guanidine, pyridine, amine, urea, zinc chromate, calcium chromate or strontium chromate, can be used. The anti-corrosive effects can be improved especially when vaporizable anti-corrosive agents (organic or anorganic acid salts of amines, amides or imides) such as dicyclohexylamine nitrite, cyclohexylamine chromate, diisopropylamine nitrite, diethanolamine phosphate, cyclohexylammonium carbonate, hexamethylenediamine carbonate, propyrenediamine stearate, guanidine carbonate, triethanolaminenitrite or morpholine stearate are employed. These anti-corrosive agents can be used in an amount of 0.1 to 20 parts by weight to 100 parts by weight of the ferromagnetic fine powders.

The components of the magnetic layer are dissolved in an organic solvent to give a magnetic paint which is then coated on the non-magnetic substrate or base material. The solvent for the magnetic paint may be enumerated by ketones such as acetone, methylethylketone or cyclohexanone, esters such as methyl acetate, ethyl acetate, butyl acetate, ethyl lactate or ethylene glycol monoethyl ether acetate (Cellosolve acetate), glycol ethers such as glycol dimethyl ether, glycol monoethyl ether or dioxane, aromatic hydrocarbons such as benzene, toluene or xylene, aliphatic hydrocarbons such as hexane or heptane, or chlorinated hydrocarbons such as methylene chloride, ethylene chloride, carbon tetrachloride, chloroform, ethylene chlorohydrine or dichlorobenzene. As the material for the non-magnetic substrate, there may be employed, in addition to polyesters such as polyethylene terephthalate or polyethylene -2,6-naphthalate, polyolefins such as polyethylene or polypropyrene, cellulose derivatives such as cellulose triacetate, cellulose diacetate, cellulose acetate butylate, vinyl resin such as polyvinyl chloride or polyvinylidene chloride, or plastics such as polycarbonate, polyimide or polyamideimide, non-magnetic metals such as aluminium, copper, tin, zinc or non-magnetic alloys containing these metals, ceramics such as glass, porcelain or china, paper with or without coating or lamination of balata, or alfa-polyolefins with 2 to 10 carbon atoms, such as polyethylene, polypropyrene or ethylene-butene copolymers. The non-magnetic substrate may be in the form of a film, tape, disk, card or a drum, as desired.

The thermoplastic polyurethane-urea resin according to the present invention can also be employed as the binder for the back-coat layer, which is provided on the opposite side of the substrate with respect to the magnetic layer for preventing loose winding or preventing electric charging.

In forming the back-coat layer, the powders of non-magnetic materials are dispersed in the binder, and the resulting dispersion is dissolved in an inorganic solvent to give a back-coat layer, which is then coated on the opposite surface of the substrate with respect to the magnetic layer.

As the binder, the thermoplastic polyurethane-urea resin according to the present invention can be employed in conjunction with the aforementioned thermoplastic resin, thermosetting or reactive resin.

The organic solvents enumerated hereinabove may also be employed.

The powders of non-magnetic materials may include carbon for affording electrical conductivity to the powders, such as furnace carbon, channel carbon, acetylene carbon, thermal carbon or lamp carbon, preferably furnace carbon or thermal carbon, and inorganic pigments for controlling surface roughness and improving durability, such as gamma - $FeOOH$, gamma - $Fe_2O_3$, $Cr_2O_3$, $TiO_2$, $ZnO$, $SiO$, $SiO_2.2H_2O$, $Al_2O_3.2SiO_2.2H_2O$, $3MgO.4SiO_2.H_2O$, $MgCO_3.Mg(OH)_2.3H_2O$, $Al_2O_3$ or $Sb_2O_3$.

Furthermore, lubricants etc. may be incorporated into the back-coat layer, if so desired. As such lubricants, a silicon oil such as dialkylpolysiloxane with 1 to 5 carbon atoms in the alkyl part, dialcoxypolysiloxane with 1 to 4 carbon atoms in the alcoxy part, monoalkyl monoalcoxy polysiloxane with 1 to 5 carbon atoms in the alkyl part and 1 to 4 carbon atoms in the alcoxy part, phenylpolysiloxane or fluoroalkylpolysiloxane with 1 to 5 carbon atoms in the alkyl part, fine powders of the electrically conductive materials, such as graphite, fine powders of inorganic materials such as molybdenum disulfide or wolfram disulfide, fine powders of plastics such as polyethylene, polypropyrene, polyethylenevinyl chloride copolymer or polytetrafluoroethylene, alfa-olefin polymers, unsaturated aliphatic hydrocarbons that are liquid at ambient temperature (compounds with an n-olefin double bond or n-olefin double bonds attached to a terminal carbon or terminal carbons, with about 20 carbons), fatty acid esters consisting of monobasic fatty acids with 12 to 20 carbons and monohydric alcohols with 3 to 12 carbons, or fluorocarbons, may be employed. These lubricants may be employed in an amount of 0.2 to 20 parts by weight to 100 parts by weight of the binder.

The back-coat can be applied not only to the so-called coat type magnetic recording medium in which the magnetic paint is coated on the non-magnetic substrate to give the magnetic layer, but also to the thin ferromagnetic metal film type magnetic recording medium (so-called metallized tape) in which magnetic metals or alloys are vaporized and deposited on the non-magnetic substrate to give the magnetic layer.

Any metal or alloy materials capable of forming ferromagnetic thin films can be used, such as metals, e.g. iron (Fe), cobalt (Co) or nickel (Ni) or alloys e.g. Co—Ni, Fe—Co, Fe—Ni or Co—Ni—Fe—B alloys.

The ferromagnetic thin film can be applied, for example, by the vacuum deposition process, the ion plating process, or the sputtering process.

In the vacuum metallizing process, the magnetic metal materials are vaporized by resistance heating, high frequency heating or electron beam heating under a vacuum of $10^{-4}$ to $10^{-3}$ Torr for depositing vaporized magnetic metal materials on the non-magnetic substrate. The process is classified into the oblique type deposition and the perpendicular type deposition. The oblique deposition is carried out in such a manner that the ferromagnetic material is deposited obliquely on the non-magnetic substrate in order to provide an elevated coercive force. The process may be effected in an oxygen atmosphere in order to further elevate the coercive force. In the perpendicular deposition, process, for improving deposition efficiency and providing an elevated coercive force, the undercoat layer of bismuth (Bi), thallium (Tl), antimony (Sb), gallium (Ga), germanium (Ge) or the like metal is formed on the non-magnetic substrate and the magnetic metal material is deposited perpendicularly on the undercoat layer.

In the ion plating method, DC glow discharge or RF glow discharge is induced in an atmosphere consisting essentially of an inert gas, usually an argon gas, and maintained at a vacuum of $10^{-4}$ to $10^{-3}$ Torr for vaporizing the metal in the course of electrical discharge.

In the sputtering process, a glow discharge is induced in an atmosphere consisting essentially of argon at a vacuum of $10^{-3}$ to $10^{-1}$ Torr and the argon ions thus produced are impinged on the target to strike out the atoms of the target material from the target surface. The process may be classified into a dc double pole process, dc triple pole process and a high frequency process according to the method of inducing the glow discharge. There is also known the magnetron sputtering method resorting to magnetron discharge.

The present invention will be explained further by referring to certain specific examples. It is to be noted that these examples are given only by way of illustration and are not intended for limiting the scope of the invention.

SYNTHESIS EXAMPLE 1

1000 g (1.0 mol) of polybutylene adipate with the molecular weight of 1,000, 42 g (0.40 mol) of neopentyl glycol, 588 g (2.35 mols) of 4,4-diphenylmethane diisocyanate and 1600 g of methylethylketone were charged into a reaction vessel fitted with a stirring propeller, a thermometer, a condenser and an annexed heating-/cooling unit, for carrying out the reaction at 75° to 80° C. for four hours. To the reaction product was then added 800 g of methylethylketone, and the mixture was cooled to close to ambient temperature.

In a separate reaction vessel, 149 g (0.87 mol) of isophorone was dissolved in 800 g of methylethylketone and 2140 g of cyclohexanone. To the resulting solution was added 6.9 g (0.096 mol) of phthalic acid anhydride and the reaction was effected for one hour at room temperature to 50° C. for preparing a solution of the COOH group containing organic diamine mixture.

The solution was charged into the firstly mentioned reaction vessel for effecting the reaction at ambient temperature. When a predetermined viscosity is reached, an amount of glycol corresponding to the residual isocyanate groups was added to the mixture for providing terminal OH groups.

The samples B through E of the thermoplastic polyurethane-urea resin containing —COOH groups were prepared in accordance with the above described method of preparation and by using various values of the mol numbers of polybutylene adipate, neopentyl glycol, 4,4'-diphenylmethane diisocyanate, isophorone diamine and phthalic acid anhydride.

SYNTHESIS EXAMPLE 2

1250 g (1.0 mol) of polycaprolactone diol with molecular weight of 1250, 21 g (0.20 mol) of neopentyl glycol, 51 g (0.20 mol) of diethyl-N, N-bis (2-hydroxyethyl) aminomethyl-phosphonate, 525 g (2.1 mol) of 4, 4'-diphenylmethane-diisocyanate and 1850 g of methylethylketone were charged into a reaction vessel provided with a stirring propeller, a thermometer, a condenser and an annexed heating/cooling unit. After the reaction for 4 hours at 75°-80° C., 925 g of methylethylketone was added to the reaction product and the resulting mixture was cooled to close to room temperature.

An organic diamine solution, obtained by dissolving 113% g (0.67 mol) of isophorone diamine in 1800 g of cyclohexanone, was added to the reaction mixture. The reaction proceeded as the organic diamine solution was added to the mixture. The solution was elevated in viscosity with the progres of the reaction. When the viscosity of the solution reached a preset value, an amount of glycol corresponding to the amount of residual isocyanate groups was added to the solution for converting the terminal groups into OH groups.

In accordance with the above described synthesis process, samples F through H, that is

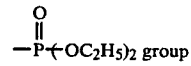

containing thermoplastic polyurethane-urea resin, were synthesized by using various values of the mol numbers of polycaprolactone diol, neopentyl glycol, diethyl-N,N-bis(2-hydroxyethyl) aminomethylphosphonate, 4,4-diphenylmethanediisocyanate and isophorone diamine.

SYNTHESIS EXAMPLE 3

The reaction vessel fitted with a thermometer, a stirring propeller and a condenser was charged with dimethyl terephthalate, 5-sodium sulfo-dimethyl isophthalate, ethylene glycol, zinc acetate and sodium acetate for carrying out an ester exchange reaction at 140°-220° C. for 3 hours. To the reaction product was added sebacic acid and the reaction was carried out at 210°-250° C. for 2 hours. The pressure of the reaction system was reduced for 30 minutes to 20 mmHg and the polycondensation reaction was carried out at 5 to 20 mmHg at 250° C. for 50 minutes for producing the diol containing —SO₃Na groups.

This —SO₃Na group containing diol was subjected to chain prolongation by using 4,4'-diphenylmethane diisocyanate in toluene and methylisobutylketone for providing the terminal —NCO groups.

To the resulting resin was added isophorone diamine for effecting a further chain prolongation by urea bonds. Finally, excess ethylene glycol was added to the resin for converting the terminal groups into OH groups.

In accordance with the above described synthesis process, samples I through L, that is, the —SO₃Na group containing thermoplastic polyurethane-urea resin, were synthesized by using various values of the mol numbers of 4,4'-diphenylmethanediisocyanate and isophorone diamine.

SYNTHESIS EXAMPLE 4

A reaction vessel fitted with a stirring propeller, a thermometer and a condenser was charged with polybutylene adipate, neopentyl glycol, glycerin, 4,4'-diphenylmethane diisocyanate and methylethylketone and the reaction was effected at 75°-80° C. for 4 hours for synthesis of an urethane resin having OH groups in the side chain and terminal —NCO groups.

To this resin was added an organic diamine solution formed by dissolving isophorone diamine in methylethylketone and cyclohexanone. As the preset viscosity was reached, excess ethylene glycol was added for converting the terminal groups into OH groups.

The resulting product was further reacted with $ClCH_2CH_2OSO_3Na$ in the presence of pyridine for introducing the —$OSO_3Na$ group to the OH groups in the side chains.

In accordance with the above described synthesis process, samples M, N, that is, thermoplastic polyurethane-urea resin containing —$OSO_3Na$ groups, were synthesized by using various values of the mol numbers of polybutylene adipate, neopentyl glycol, glycerin, 4,4'-diphenylmethane diisocyanate and isophorone diamine.

The properties of the resin samples obtained in the Synthesis Examples 1 to 4 are shown in Table 1.

It should be noted that, in this Table, the sample A was prepared from 1000 g (1.0 mol) of polybutylene adipate, 18 g (0.2 mol) of 1,4-butanediol and 300 g (1.2 mol) of 4,4'-diphenylmethane diisocyanate, and is a polyester-polyurethane resin free of urea groups and with the concentration of the urea groups of the order of 1.8 m mol/g.

It should also be noted that, in this Table 1, the glass transition temperature was measured by using a torsional blade analysis (manufactured by Rigaku Denki KK) in accordance with the TBA process, and that, in measuring the softening temperature, the specimen was cut with a JIS No. 2 dumbell and, with a load equivalent to 5 g/100 μm applied thereto, the temperature was increased at the rate of 5° C. per minute, the temperature at which the specimen underwent a rapid increase in deformation was noted and used as the softening temperature.

EXAMPLE 1

A starting mixture having the following composition was used for the magnetic paint.

| | |
|---|---|
| Co-coated gamma - $Fe_2O_3$ | 100 wt. parts |
| vinyl chloride/vinyl acetate copolymer (VAGH manufactured by UCC Inc.) | 10 wt. parts |
| thermoplastic polyurethane-urea resin containing hydrophilic polar groups (sample B) | 15 wt. parts |
| dispersant (lecitin) | 0.5 wt. parts |
| lubricant (silicon oil) | 1 wt. parts |
| abrasive ($Cr_2O_3$) | 2 wt. parts |
| methylethylketone | 100 wt. parts |
| methylisobutylketone | 50 wt. parts |
| toluene | 50 wt. parts |

The mixture having the above composition was ball milled for 48 hours and filtered by using a 3 micron mesh filter. The mixture was mixed with 2.5 parts by weight of "Desmodule L" (manufactured by Bayer AG) as a curing agent. The mixture was mixed for 30 minutes and coated on a polyethylene terephthalate film having a thickness of 16 microns so as to give a coating having a dry thickness of 6 microns. The film was subjected to magnetic orientation, dried, and wound on a reel. The tape was calendered and cut into ½ inch wide sample tapes.

EXAMPLES 2-13

In these Examples 2 through 13, the procedures of the Example 1 were followed with the exception that the samples C, D, E, F, G, H, I, J, K, L, M and N (thermoplastic polyurethane-urea resin) were used respectively in place of the sample B (thermoplastic polyurethane-urea resin) and respective sample tapes were also prepared in the same manner as in Example 1.

COMPARATIVE EXAMPLE 1

The procedures of Example 1 were followed with the exception that, in place of the sample B (polyurethane-urea resin) in the composition of Example 1, the sample A (polyester polyurethane resin) was used, and a sample tape was prepared in the same manner as in Example 1.

The measured results of tackiness or adhesion, still characteristics, the amount of rubbed-off powders, surface gloss and Y-SN ratio of these sample tapes are shown in the following Table 2.

TABLE 1

| Samples | Conc. of urethane groups (mmol/g) | Conc. of urea groups (mmol/g) | Conc. of urethane + urea groups (mmol/g) | Conc. of urea groups / Conc. of urethane groups | Amount of hydrophilic polar groups (mmol/g) | Number average molecular weight × $10^4$ | Softening temperature (°C.) | Glass transition temperature (°C.) |
|---|---|---|---|---|---|---|---|---|
| A | 1.8 | 0 | 1.8 | 0 | 0 | 4.3 | 50 | −30 |
| B | 1.42 | 0.99 | 2.37 | 0.7 | 0.06 | 4.2 | 115 | −14 |
| C | 1.5 | 0.75 | 2.15 | 0.5 | 0.15 | 4.1 | 96 | −20 |
| D | 1.0 | 1.2 | 2.2 | 1.2 | 0.35 | 3.9 | 100 | −18 |
| E | 1.6 | 0.48 | 2.08 | 0.3 | 0.10 | 4.3 | 80 | −26 |
| F | 1.42 | 0.95 | 2.37 | 0.67 | 0.12 | 4.5 | 113 | −16 |
| G | 1.73 | 0.76 | 2.49 | 0.44 | 0.33 | 4.6 | 130 | −12 |
| H | 1.30 | 0.9 | 2.2 | 0.05 | 0.05 | 4.2 | 98 | −18 |
| I | 1.42 | 0.99 | 2.41 | 0.7 | 0.075 | 2.5 | 120 | −17 |
| J | 1.6 | 0.48 | 2.08 | 0.3 | 0.075 | 2.4 | 115 | −20 |
| K | 1.73 | 0.76 | 2.49 | 0.44 | 0.15 | 2.5 | 135 | −13 |
| L | 1.41 | 0.98 | 2.39 | 0.7 | 0.05 | 2.6 | 118 | −17 |
| M | 1.43 | 0.98 | 2.41 | 0.69 | 0.073 | 2.6 | 119 | −18 |
| N | 1.73 | 0.77 | 2.50 | 0.45 | 0.076 | 2.5 | 133 | −14 |

In determining tape adhesion, the sample tape was wound on a reel and allowed to stand for 24 hours at the temperature of 40° C. and relative humidity of 80%, and the peeled-off state of the tape was visually checked and evaluated by a 10-score method. The better the adhesion characteristics, the lower the score assigned to the tape.

The still characteristics were determined in terms of the time elapsed until the reproducing output of the 4.2 MHz video signals recorded on the sample tape was attenuated by 50 percent.

The amount of rubbed-off powders was determined by visually checking the amount of the rubbed-off powders onto a head drum, a guide or the like after 100-times shuttle running for 60 minutes. The least and maximum amounts were evaluated by a score 0 and a score −5, respectively.

Surface gloss was determined in terms of the light reflectivity as measured with a gloss meter at an incident angle of 75° and the reflective angle of 75°.

The Y-SN ratio was determined in terms of the signal to noise ratio of the monochromatic image recorded on the sample tape and by using the value for the Comparative Example 1 as the reference.

TABLE 2

|  | Adhesion | Still characteristics (in minutes) | Amount of rubbed-off powders | Surface gloss (%) | Y-SN ratio (dB) |
| --- | --- | --- | --- | --- | --- |
| Ex. 1 | 1.0 | 1600 | less than −0.5 | 93 | +2.5 |
| Ex. 2 | 2.0 | 1000 | " | 89 | +1.5 |
| Ex. 3 | 1.5 | 1400 | " | 85 | +0.8 |
| Ex. 4 | 2.5 | 900 | " | 90 | +2.1 |
| Ex. 5 | 1.0 | 1630 | " | 89 | +1.7 |
| Ex. 6 | 0.5 | 1800 | " | 86 | +1.0 |
| Ex. 7 | 1.5 | 1200 | " | 90 | +2.3 |
| Ex. 8 | 1.0 | 1700 | " | 95 | +2.0 |
| Ex. 9 | 1.5 | 1650 | " | 98 | +2.5 |
| Ex. 10 | 0.5 | 1800 | " | 93 | +2.0 |
| Ex. 11 | 1.0 | 1650 | " | 90 | +1.5 |
| Ex. 12 | 1.0 | 1650 | " | 94 | +2.0 |
| Ex. 13 | 0.5 | 1780 | " | 92 | +1.8 |
| Comp. Ex. 1 | 4.5 | 800 | −3.5 | 75 | 0 |

It is seen from this Table 2 that, by using the thermoplastic polyurethane-urea resin containing the hydrophilic polar groups as the binder for the magnetic layer of the magnetic recording medium, the recording medium can be remarkably improved in its thermal characteristics, anti-blocking and durability and dispersibility of the ferromagnetic powders.

EXAMPLE 14

A starting mixture having the following composition was used for the magnetic paint.

| | |
| --- | --- |
| Co-coated gamma - Fe$_2$O$_3$ | 100 wt. parts |
| vinyl chloride-vinyl acetate copolymer (VAGH manufactured by UCC Inc.) | 15 wt. parts |
| polyurethane resin (N-2304 manufactured by Nippon Polyurethane Co. Ltd.) | 10 wt. parts |
| dispersant (lecitin) | 1 wt. parts |
| lubricant (silicon oil) | 1 wt. parts |
| abrasive (Cr$_2$O$_3$) | 2 wt. parts |
| methylethylketone | 100 wt. parts |
| methylisobutylketone | 50 wt. parts |
| toluene | 50 wt. parts |

The mixture having the above composition was ball milled for 48 hours and filtered by using a 3 micron mesh filter. The mixture was mixed with 2.5 parts by weight of "Desmodule L" (manufactured by Bayer AG) as a curing agent. The mixture was further mixed for 30 minutes to give a magnetic paint, which was then coated on a polyethylene terephthalate film having a thickness of 16 microns so as to give a coating having a dry thickness of 6 microns. The film was then subjected to magnetic orientation, dried, wound on a reel and calendered.

On the other hand, a starting mixture having the following composition was prepared for the back coat.

| | |
| --- | --- |
| carbon | 100 wt. parts |
| vinyl chloride-vinyl acetate copolymer (VAGH, manufactured by UCC Inc.) | 15 wt. parts |
| thermoplastic polyurethane-urea resin containing hydrophilic polar groups (sample B) | 35 wt. parts |
| dispersant (lecitin) | 0.5 wt. parts |
| methylethylketone | 180 wt. parts |
| methylisobutylketone | 90 wt. parts |
| toluene | 180 wt. parts |

The mixture having the following composition was ball-milled for 48 hours and filtered through a 1 micron mesh filter. The mixture was mixed with 5 parts by weight of "Desmodule L" (manufactured by Bayer AG) as a curing agent. The mixture was further mixed for 30 minutes to give a back coat, which was then applied to the reverse surface of the polyethylene terephthalate film with respect to the magnetic layer so that a back-coat layer having a coating thickness of 2 to 3 microns was formed. The resulting product was heat-treated and cut into a ½ wide sample tape.

EXAMPLE 15

A starting mixture having the following composition was prepared for the back coat.

| | |
| --- | --- |
| carbon | 100 wt. parts |
| vinyl chloride-vinyl acetate copolymer (VAGH, manufactured by UCC Inc.) | 7.5 wt. parts |
| thermoplastic polyurethane-urea resin containing hydrophilic polar groups (sample B) | 17.5 wt. parts |
| dispersant (lecitin) | 0.5 wt. parts |
| methylethylketone | 180 wt. parts |
| methylisobutylketone | 90 wt. parts |
| toluene | 180 wt. parts |

A back coat paint was prepared from this starting mixture and 25 parts by weight of "Desmodule L" (manufactured by Bayer AG). A sample tape was prepared by forming the magnetic and back-coat layers in the similar manner as in Example 14.

EXAMPLE 16

A starting mixture having the following composition was prepared for a back coat.

| | |
| --- | --- |
| carbon | 100 wt. parts |
| vinyl chloride-vinyl acetate copolymer (VAGH, manufactured by UCC Inc.) | 17.5 wt. parts |
| thermoplastic polyurethane-urea resin containing hydrophilic | 7.5 wt. parts |

| | -continued | |
|---|---|---|
| polar groups (sample B) | | |
| dispersant (lecitin) | 0.5 wt. parts | |
| methylethylketone | 180 wt. parts | |
| methylisobutylketone | 90 wt. parts | |
| toluene | 180 wt. parts | |

A back coat was prepared from this starting mixture and 25 parts by weight of "Desmodule L" (manufactured by Bayer AG). A sample tape was prepared by forming the magnetic and back-coat layers in the similar manner as in Example 14.

EXAMPLES 17–23

In these Examples 17 through 23, the sample tape was prepared by using the procedures of Example 14, with the exception that samples C, D, E, F, G, H, I (thermoplastic polyurethane-urea resin containing hydrophilic polar groups), were used respectively in place of the sample B (thermoplastic polyurethane-urea resin containing hydrophilic polar groups) in the starting mixture for the back coat in Example 14.

EXAMPLE 24

A sample tape was prepared by using the procedures of Example 15, with the exception that the sample I (thermoplastic polyurethane-urea resin containing hydrophilic polar groups) was used in place of the sample B (thermoplastic polyurethane-urea resin containing hydrophilic polar groups) in the back coat composition of Example 15.

EXAMPLE 25

A sample tape was prepared by using the procedures of Example 16, with the exception that the sample I (thermoplastic polyurethane-urea resin containing hydrophilic polar groups) was used in place of the sample B (thermoplastic polyurethane-urea resin) in the back coat composition of Example 16.

EXAMPLES 26–28

Sample tapes were prepared by using the procedures of the Example 14, with the exception that samples J, K and L (thermoplastic polyurethane-urea resins containing hydrophilic polar groups) were respectively used in place of the sample B (thermoplastic polyurethane-urea resins containing hydrophilic polar groups) in the back coat composition of Example 14.

COMPARATIVE EXAMPLE 2

A sample tape was prepared by using the procedures of the Example 14, with the exception that the sample A (polyester polyurethane resin) was used in place of the sample B (thermoplastic polyester-urea resin containing hydrophilic polar groups) in the back coat composition of the Example 14.

These sample tapes were measured for adhesion-peeling, susceptibility to damages and surface gloss. The results are shown in Table 3.

In determining adhesion-peeling, the sample tape was wound on a reel and allowed to stand for 24 hours at a temperature of 40° C. and a relative humidity of 80 percent and the peeling state of the sample tape was visually checked and evaluated by a 10-score method. The more favorable the tape adhesion, the lower the score given to the tape. In determining susceptibility to damage, the state of the damage to the back coat of the 10-minute long sample tape after 100 times shuttle running of the tape was visually checked and marks , , and Δ were respectively given to the extremely favorable, generally favorable and slightly injured states of the tape, whereas the mark X was given to the severely damaged state of the tape accompanied by considerable powder debris on the pinch roll and guide member. Surface gloss was measured with a gloss meter and in terms of light reflectivity for the incident angle of 75° and the reflective angle of 75°.

TABLE 3

| | adhesion-peeling | susceptibility to damage | surface gloss (%) |
|---|---|---|---|
| Ex. 14 | 1.5 | | 86 |
| Ex. 15 | 0.5 | | 88 |
| Ex. 16 | less than 0.5 | Δ | 78 |
| Ex. 17 | 2.5 | | 83 |
| Ex. 18 | 2.5 | ~ | 80 |
| Ex. 19 | 3.0 | Δ~ | 85 |
| Ex. 20 | 1.5 | | 85 |
| Ex. 21 | 1.0 | | 81 |
| Ex. 22 | 2.0 | Δ~ | 87 |
| Ex. 23 | 2.0 | | 88 |
| Ex. 24 | 0.5 | | 90 |
| Ex. 25 | 0.5 | Δ | 80 |
| Ex. 26 | 3.5 | Δ~ | 87 |
| Ex. 27 | 1.5 | | 88 |
| Ex. 28 | 2.5 | | 86 |
| Comp. Ex. 2 | 5.0 | Δ | 62 |

From the foregoing it is seen that the thermoplastic polyurethane-urea resin with the hydrophilic polar groups introduced therein may be used as the binder for the back coat of the magnetic recording medium in such a manner that general-purpose solvents may be used for the preparation of the magnetic recording medium and the back coat paint can be handled more easily. In addition, the back coat is not adhered to the magnetic layer, while the recording medium may have superior anti-blocking and durability, with extremely favorable dispersion of the powder components in the binder.

What is claimed is:

1. A magnetic recording medium comprising a nonmagnetic substrate and a magnetic layer formed thereon composed mainly of magnetic powder and a binder, said binder containing a thermoplastic polyurethane-urea resin hardened by a polyisocyanate and having at least one hydrophilic polar group selected from the group consisting of the groups represented by general formulas:

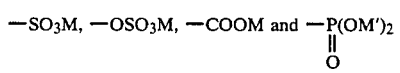

wherein M is hydrogen or alkali metal and M' is hydrogen, alkali metal or hydrocarbon group, the total concentration of urea groups and urethane groups in said resin being between 1.8 and 3 m mol/g, and the concentration ration between urea groups and ureathane groups in said resin being between 0.3 and 1.6.

2. The magnetic recording medium according to claim 1, wherein the thermoplastic polyurethane-urea resin is obtained by the polyaddition reaction of
   (A) a long-chain diol having a molecular weight in a range of about 500 to 5000;
   (B) a short-chain diol having a molecular weight in a range of about 50 to 500;

(C) an organic diamine;
(D) an organic diisocyanate; and
(E) a compound having at least one hydrophilic polar group selected from the group consisting of the groups represented by general formulas:

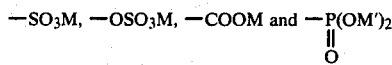

wherein M is hydrogen or alkali metal and M' is hydrogen, alkali metal or hydrocarbon group.

3. The magnetic recording medium according to claim 1, wherein the thermoplastic polyurethane-urea resin is cured with a polyisocyanate curing agent.

4. The magnetic recording medium according to claim 1, wherein the concentration of hydrophilic polar group in said resin is between 0.01 and 1.0 m mol/g.

5. The magnetic recording medium according to claim 4, wherein the concentration of hydrophilic polar group in said resin is between 0.1 and 0.5 m mol/g.

6. The magnetic recording medium according to claim 1, wherein the number-average molecular weight of said resin is between 10000 and 100000.

7. The magnetic recording medium according to claim 6, wherein the number-average molecular weight of said resin is between 10000 and 60000.

8. The magnetic recording medium according to claim 1, wherein the softening point of said resin is not less than 80° C.

9. The magnetic recording medium according to claim 8, wherein the softening point of said resin is not less than 100° C.

10. The magnetic recording medium according to claim 1, wherein the glass transition point of said resin is not more than 0° C.

11. The magnetic recording medium according to claim 10, wherein the glass transition point of said resin is not more than −10° C.

12. The magnetic recording medium according to claim 2, wherein the weight ratio of the short-chain diol to the long-chain diol is not more than 3.

13. The magnetic recording medium according to claim 2, wherein the long-chain diol is a polyester diol, a polyether diol or a polyether ester diol.

14. The magnetic recording medium according to claim 13, wherein the polyester diol is obtained by the reaction of an aliphatic dicarboxylic acid, an aromatic dicarboxylic acid or a lower alcohol ester of the dicarboxylic acid with a glycol.

15. The magnetic recording medium according to claim 14, wherein the aliphatic dicarboxylic acid is succinic acid, adipic acid, sebacic acid or azelaic acid.

16. The magnetic recording medium according to claim 14, wherein the aromatic dicarboxylic acid is terephthalic acid or isophthalic acid.

17. The magnetic recording medium according to claim 14, wherein the lower alcohol ester of dicarboxylic acid is a methyl or ethyl ester.

18. The magnetic recording medium according to claim 14, wherein the glycol is ethylene glycol, 1,3-propylene glycol, 1,4-butylene glycol, 1,6-hexane glycol, diethylene glycol, neopentyl glycol or an ethylene oxide or propylene oxide adduct of bisphenol A.

19. The magnetic recording medium according to claim 2, wherein the long-chain diol is a polyester diol, a polyether diol or a polyether ester glycol.

20. The magnetic recording medium according to claim 19, wherein the polyester diol is obtained by the reaction of an aliphatic dicarboxylic acid, an aromatic dicarboxylic acid or a lower alcohol ester of the dicarboxylic acid with a glycol.

21. The magnetic recording medium according to claim 20, wherein the aliphatic dicarboxylic acid is succinic acid, adipic acid, sebacic acid or azelaic acid.

22. The magnetic recording medium according to claim 20, wherein the aromatic dicarboxylic acid is terephthalic acid or isophthalic acid.

23. The magnetic recording medium according to claim 20, wherein the lower alcohol ester is a methyl or ethyl ester.

24. The magnetic recording medium according to claim 20, wherein the glycol is ethylene glycol, 1,3-propylene glycol, 1,4-butylene glycol, 1,6-hexane glycol, diethylene glycol, neopentyl glycol or an ethylene oxide or propylene oxide adduct of bisphenol A.

25. The magnetic recording medium according to claim 19, wherein the polyether diol is obtained by the cleavage polymerization of a lactone.

26. The magnetic recording medium according to claim 25, wherein the lactone is $\epsilon$-caprolactone.

27. The magnetic recording medium according to claim 19, wherein the polyether diol is polyether glycol.

28. The magnetic recording medium according to claim 27, wherein the polyether glycol is polyethylene glycol, polypropylene ether glycol or polytetramethylene ether glycol.

29. The magnetic recording medium according to claim 19, wherein the polyether ester glycol is a polyester glycol obtained by the reaction of a polyalkylene ether glycol with an aliphatic dicarboxylic acid or an aromatic dicarboxylic acid.

30. The magnetic recording medium according to claim 29, wherein the polyalkylene ether glycol is polyethylene glycol, polypropylene ether glycol or polytetramethylene ether glycol.

31. The magnetic recording medium according to claim 29, wherein the aliphatic acid is succinic acid, adipic acid, sebacic acid or azelaic acid.

32. The magnetic recording medium according to claim 29, wherein the aromatic acid is terephthalic acid or isophthalic acid.

33. The magnetic recording medium according to claim 2, wherein the short-chain diol is an aliphatic glycol or an aromatic diol.

34. The magnetic recording medium according to claim 33, wherein the aliphatic glycol is ethylene glycol, propylene glycol, 1,4-butylene glycol, 1,6-hexane glycol or neopentyl glycol.

35. The magnetic recording medium according to claim 33, wherein the aromatic diol is an ethylene oxide or propylene oxide adduct of bisphenol A or an ethylene oxide adduct of hydroquinone.

36. The magnetic recording medium according to claim 2, wherein the orgnaic diamine is an aliphatic diamine, an aromatic diamine or an alicyclic diamine.

37. The magnetic recording medium according to claim 2, wherein the organic diisocyanate is an aliphatic diisocyanate, an aromatic diisocyanate or an alicyclic diisocyanate.

38. The magnetic recording medium according to claim 2, wherein the compound having hydrophilic polar group is a diol having hydrophilic polar group, a diamine having hydrophilic polar group or a diisocyanate having hydrophilic polar group.

39. A magnetic recording medium comprising a non-magnetic substrate, a magnetic layer formed on one surface of said non-magnetic substrate and a back coating layer composed of a binder and non-magnetic pigment formed on the other surface of said non-magnetic substrate, said binder containing a thermoplastic polyurethane-urea resin hardened by a polyisocyanate and having at least one hydrophilic polar group selected from the group consisting of the groups represented by general formulas:

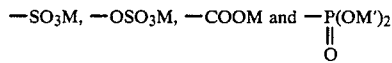

wherein M is hydrogen of alkali metal and M' is hydrogen metal or hydrocarbon group, the total concentration of urea groups and urethane groups in said resin being between 1.8 and 3 m mol/g, and the concentration ratio between urea groups and urethane groups in said resin being between 0.3 and 1.6.

40. The magnetic recording medium according to claim 39, wherein the thermoplastic polyurethane-urea resin is obtained by the polyaddition reaction of
(A) a long-chain diol having a molecular weight in a range of about 500 to 5000;
(B) a short-chain diol having a molecular weight in a range of about 50 to 500;
(C) an organic diamine;
(D) an organic diisocyanate; and
(E) a compound having at least one hydrophilic polar group selected from the group consisting of the groups represented by general formulas:

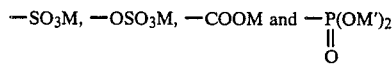

wherein M is hydrogen or alkali metal and M' is hydrogen, alkali metal or hydrocarbon group.

41. The magnetic recording medium according to claim 39, wherein the thermoplastic polyurethane-urea resin is cured with a polyisocyanate curing agent.

42. The magnetic recording medium according to claim 39, wherein the concentration of hydrophilic polar group in said resin is between 0.01 and 1.0 m mol/g.

43. The magnetic recording medium according to claim 42, wherein the concentration of hydrophilic polar group in said resin is between 0.1 and 0.5 m mol/g.

44. The magnetic recording medium according to claim 39, wherein the number-average molecular weight of said resin is between 10000 and 100000.

45. The magnetic recording medium according to claim 44, wherein the number-average molecular weight of said resin is between 10000 and 60000.

46. The magnetic recording medium according to claim 39, wherein the softening point of said resin is not less than 80° C.

47. The magnetic recording medium according to claim 46, wherein the softening point of said resin is not less than 100° C.

48. The magnetic recording medium according to claim 39, wherein the glass transition point of said resin is not more than 0° C.

49. The magnetic recording medium according to claim 48, wherein the glass transition point of said resin is not more than −10° C.

50. The magnetic recording medium according to claim 40, wherein the weight ratio of the short-chain diol to the long-chain diol is not more than 3.

51. The magnetic recording medium according to claim 39, wherein the magnetic layer is composed mainly of magnetic powder and a binder.

52. The magnetic recording medium according to claim 39, wherein the magnetic layer is composed of ferromagnetic metal thin film.